(12) United States Patent
Ferrari et al.

(10) Patent No.: US 8,519,308 B2
(45) Date of Patent: Aug. 27, 2013

(54) PERFORATED LID FOR CONTAINERS FOR COOKING FOOD

(75) Inventors: Luciano Ferrari, Latina (IT); Marco Ferrari, Latina (IT)

(73) Assignee: BY ME S.R.L., Latina (IT)

( * ) Notice: Subject to any disclaimer, the term of this patent is extended or adjusted under 35 U.S.C. 154(b) by 83 days.

(21) Appl. No.: 13/146,912

(22) PCT Filed: Jan. 29, 2010

(86) PCT No.: PCT/IT2010/000027
§ 371 (c)(1),
(2), (4) Date: Oct. 11, 2011

(87) PCT Pub. No.: WO2010/086892
PCT Pub. Date: Aug. 5, 2010

(65) Prior Publication Data
US 2012/0193346 A1    Aug. 2, 2012

(30) Foreign Application Priority Data
Feb. 2, 2009   (IT) .............................. RM2009A0046

(51) Int. Cl.
*F27D 11/00*   (2006.01)
*B65D 51/16*   (2006.01)

(52) U.S. Cl.
USPC ........... 219/438; 219/401; 219/440; 219/430; 219/431; 220/231; 220/368; 220/369; 126/384.1; 126/389.1; 126/299 C

(58) Field of Classification Search
USPC ......... 219/438, 401, 440, 430, 431; 220/231, 220/368–9; 126/384.1, 389.1, 299 C
See application file for complete search history.

(56) References Cited

U.S. PATENT DOCUMENTS

| 626,808 | A | 6/1899 | Burney |
| 4,091,956 | A | 5/1978 | Vecchio |

FOREIGN PATENT DOCUMENTS

| EP | 0 109 690 | 5/1984 |
| EP | 1 745 727 | 1/2007 |
| EP | 1 753 330 | 5/2008 |
| WO | WO 98/58578 | 12/1998 |

OTHER PUBLICATIONS

International Search Report dated Apr. 9, 2010.

*Primary Examiner* — Shawntina Fuqua
(74) *Attorney, Agent, or Firm* — Hedman & Costigan, P.C.; James V. Costigan; Kathleen A. Costigan

(57) ABSTRACT

The present invention concerns an improved perforated lid (10) for containers for cooking foods, comprising holes (15) for the passage of vapor and gas going upwards and of condensed vapor going downwards and means for cooling and condensing vapor passing through said holes, and means for supporting said means for cooling vapor, wherein said means for cooling vapor are made of a sequence, starting from the container for cooking foods and going upwards, comprised of a perforated lower plate (11), at least one perforated intermediate plate (12) and an upper plate (13) that is not perforated, and said means for supporting said means for cooling vapor are made of a lower spacing element (16), positioned between said lower plate (11) and said intermediate plate (12) and of an upper spacing element (18), positioned between said intermediate plate (12) and said upper plate (13).

Figure 1:
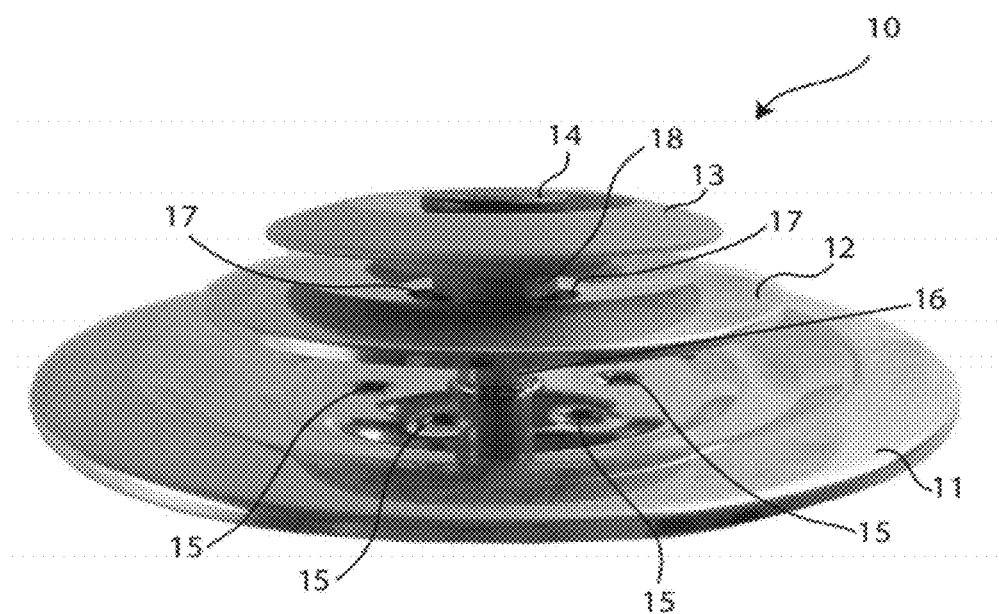

The invention further concerns a fryer (20) for use with said perforated lid (10).

11 Claims, 4 Drawing Sheets

PERFORATED LID FOR CONTAINERS FOR COOKING FOOD

The present invention concerns an improved perforated lid for containers for cooking food.

More specifically, the invention concerns a lid of the above kind, studied and realised particularly to be able to recover the nutritional properties of foods containing saturated vapour deriving from the cooking.

As it is well known, at present foods cooked at home provide a cooking of the foods using gas, said cooking not always being uniform. Particularly, if foods would be cooked at an excessive temperature, most organoleptic properties would degrade and lost.

In order to solve this problem, lids exist since many years providing holes for venting saturated vapour. This operation principle privilege cooking of foods at low temperature, with a uniform distribution of the heat inside the pot, by natural convective motion. The above allows recovering the vapour phase transformed into liquid phase, thus avoiding that the food passes 100° C., and preventing the degradation of vitaminic, proteinic and lipidic components, thus reducing the energetic need (wood, town gas, methane, electricity).

However, in this kind of systems, vapour from cooking employing said lids exits under a certain pressure from the cooking container, thus dispersing in the environment nutritive properties of foods. In other words, said lids determine a high perishing of properties of foods.

In the last years, this kind of lids have been improved by positioning, above the holes for venting saturated vapour and at a certain distance therefrom, a cup for vapour collection and condensation that at the same time does not impair the passage of gases.

Recently, then, this kind of lids had a further notable improvement thanks to the European patent N. EP-B-1753330, filed on Apr. 19, 2005 and granted on May 21, 2008, in the name of the same applicant, wherein a lid is disclosed allowing at the same time for containing the heat dispersion, promoting the ordered and accelerated outlet of vapours from a cooking container through outlet paths having a suitable shape and housing, and conveying and controlling production of these vapours in such a way they fall down condensed inside the cooking pot. In particular, according to European patent N. EP-B-1753330 is disclosed an improved lid for covering containers for cooking foods, comprising means for cooling vapour placed outside and above said lid, and support means for said vapour cooling means, having an extension in the thickness direction so as to be able realising a plurality of cylindrical or profiled channels through the lid, said channels realising a passage path for the vapour coming from the container for cooking said foods outward, causing an acceleration of the vapour, said accelerated vapour contacting through said channels a lower surface of said vapour cooling means, condensing and flowing again, at a liquid phase, inside said cooking container through said plurality of channels.

This kind of lid allows for obtaining particularly fine results in case of frying. In fact, while traditional frying in closed fryers reach a temperature that can be even higher than 200° C., with subsequent development of toxic products while cooking, thanks to the improved lid according to European patent N. EP-B-1753330 is possible to obtain frying at 97° C., much below the temperature of 180° C. at which oil forms acroleine, acknowledged to be a cancerogeneous substance, but also below the temperature of 140° C. at which oil reaches its smoke point developing the first toxic substances. Further, the recycling of condensated vapour, allows for transforming the cooking container on top of which the lid is placed in a ventilated and vapour cooled oven, with the consequent benefits. Further, by non reaching the degradation temperature while cooking, oil preserves its organoleptic properties and can be used for a number of further subsequent cooking, up to five times and more.

Nonetheless, it was discovered that this kind of improved lid also, even if it allows for obtaining excellent results, presents the problem of a progressive overheating of the cup for vapour collection and condensation, with the consequence that the amount of vapour that is condensed and goes back to the cooking container is reduced with respect to the amount needed to obtain the desired cooking characteristics.

In view of the above, it is well evident the need of having a lid allowing for obtaining a cooking of the foods without loosing quality of the same foods and allowing for a cooking at not too high temperatures, thus creating also a thermal insulation with respect to the surrounding environment, allowing for increasing the amount of condensed vapours going back into the cooking container and at the same time maintaining unchanged the amount of both vapours and gases going out of the same container.

In this situation it is included the solution suggested according to the present invention.

The purpose of the present invention is therefore that of realising an improved perforated lid for cooking food allowing for overcoming the limits of the solutions according to the prior art and obtaining the previously described technical results.

A further aim of the invention is that said perforated lid can be realised with substantially reduced costs, as far as both production and operating costs is concerned.

Not last aim of the invention is that of realising a perforated lid being substantially simple, safe and reliable and that can be used with a suitably modified container for frying food.

It is therefore a first specific object of the present invention an improved perforated lid for containers for cooking food, comprising holes for the passage of vapour and gas going upwards and of condensed vapour going downwards and means for cooling and condensing vapour passing through said holes, and means for supporting said means for cooling vapour, wherein said means for cooling vapour are made of a sequence, starting from the container for cooking foods and going upwards, composed of a perforated lower plate, at least one perforated intermediate plate and an upper plate that is not perforated, and said means for supporting said vapour cooling means comprise a lower spacing element, positioned between said lower plate and said intermediate plate and an upper spacing element, positioned between said intermediate plate and said upper plate.

According to an embodiment of the invention, said perforated lid can comprise a plurality of intermediate plates, linked by a corresponding number of intermediate spacing elements.

Preferably, according to the invention, the upper surface of said lower plate and the upper surface of said at least one intermediate plate have a concavity facing upwards, and the lower surface of said upper plate and the lower surface of said at least one intermediate plate have a concavity facing downwards.

Further, according to the present invention, the lower surface of said upper plate and the lower surface of said at least one intermediate plate can be undulated or as an alternative lamellar.

Still according to the invention, said means for supporting said cooling means can be adjustable and can comprise a screw.

Finally, always according to the invention, said perforated lid can comprise a handle positioned on the upper end of said means for supporting said cooling means.

It is further a second specific object of the present invention a fryer for the use with the perforated lid as previously defined, comprising a shell made of insulating material, inside which a pot and an extractable drum are placed, together with said lid and an electric cooking stove, wherein said electric cooking stove can be separated from the remaining elements of the fryer.

Preferably, according to the invention, said fryer can comprise one or more air-tight elements of said lid on top of said pot.

Figure 2:
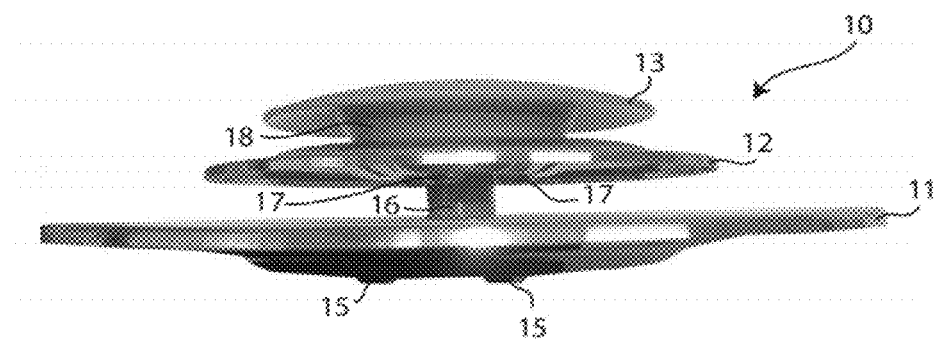
Figure 5:
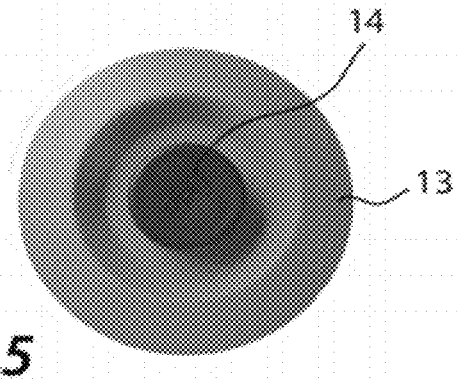
Figure 4:
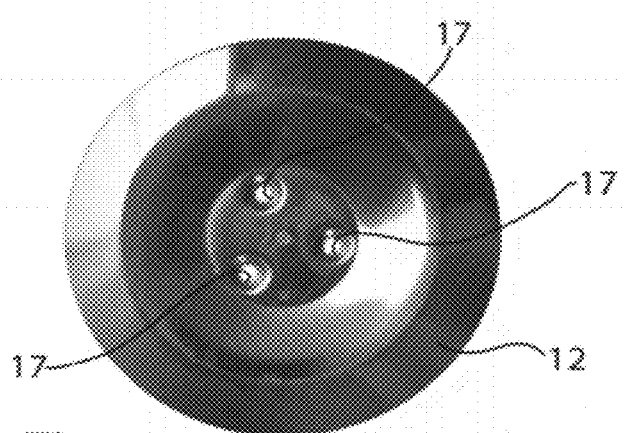
Figure 3:
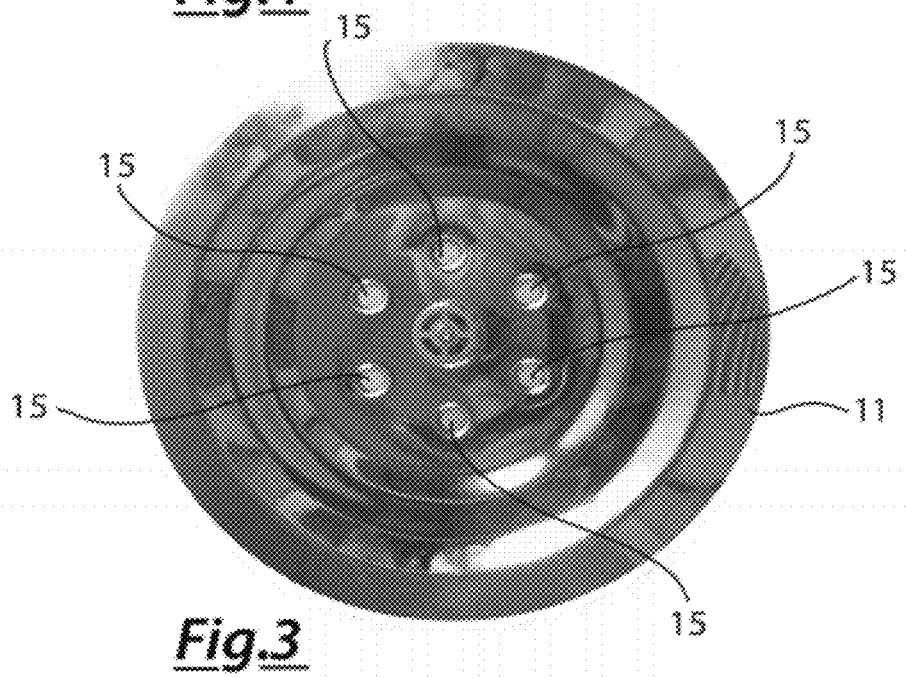
Figure 6:
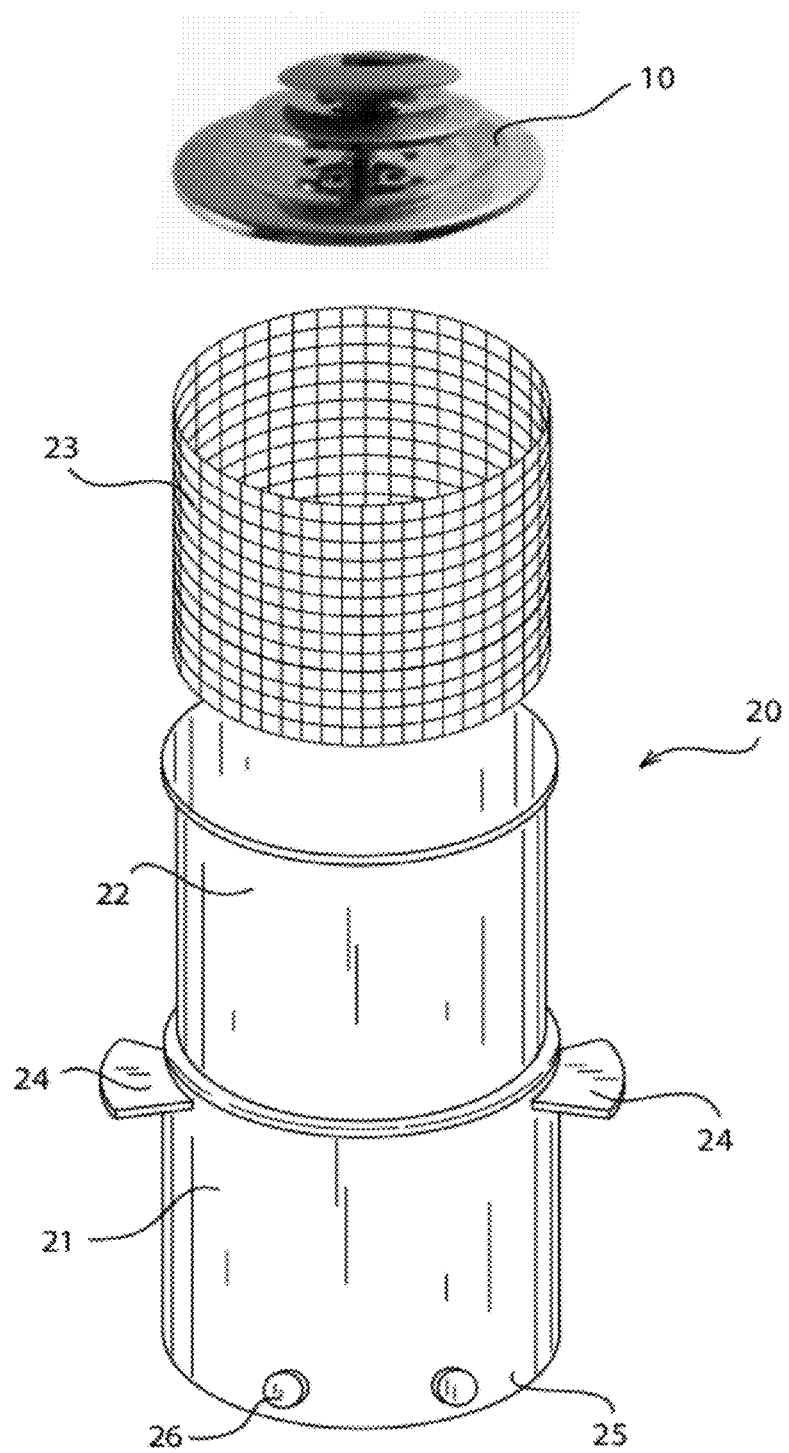

The present invention will now be described, for illustrative, non limitative purposes, according to a preferred embodiment, with reference in particular to the figures of the enclosed drawings, wherein:

FIG. 1 shows a perspective view of an improved perforated lid for containers for cooking food according to the present invention, FIG. 2 shows a lateral view of the perforated lid of FIG. 1, FIG. 3 shows a top plan view of the lower plate of the perforated lid of FIG. 1, FIG. 4 shows a top plan view of the intermediate plate of the perforated lid of FIG. 1, FIG. 5 shows a top plan view of the upper plate of the perforated lid of FIG. 1, and FIG. 6 shows an exploded view of a fryer comprising the improved perforated lid of the present invention.

With reference to the figures, the improved perforated lid for containers for cooking food according to the present invention, indicated as a whole with the numeric reference 10, is composed of a lower plate 11, constituting the element that is positioned on top of the cooking container, above which are placed in a sequence an intermediate plate 12, an upper plate 13 and a handle 14.

The lower plate 11, according to this embodiment, is provided with a curved shape so to present a lower surface that is convex downwards, that is towards the interior of the cooking container. In proximity of the centre of the lower plate 11 holes 15 are realised, the profiled shape of which creates channels for the passage of vapour and gas going out of the cooking container and for condensated vapour going back into the cooking container. Said holes 15 have a suitable diameter, and their position on the lower plate 11 reproduces, in the present embodiment, a circumference, the center of which corresponds with the center of the lower plate 11.

Above the lower plate 11 the intermediate plate 12 is mounted, by means of a lower spacing element 16 made of insulating material. Saturated vapours produced inside the cooking container pass through said holes 15 of the lower plate 11, undergoing an acceleration towards the exterior of the cooking container. Said saturated vapours coming out of holes 15 subsequently meet the lower surface of the intermediate plate 12, by contacting which, due to the lower temperature, undergo a partial condensation and fall back downwards due to gravity, passing through the same holes 15 and going back into the cooking container.

The lower surface of the intermediate plate 12 presents a suitable concave shape so that the condensate originating from said vapours accumulates on the lower surface and falls back in a higher amount on the upper surface of the lower plate 11. The upwards facing concave shape of the lower plate 11, provided for according to the preferred embodiment of the perforated lid of the present invention, favors the collection of condensate and the flowing back of liquid substances into the cooking container, through said holes 15.

The lower surface of the intermediate plate 12 can further present an undulated shape in order to increase the surface met by saturated vapour increasing the condensing effect of the intermediate plate 12.

Further, the intermediate plate 12 is provided with holes 17, realised close to the centre, the profiled shape of which defines channels for the passage of vapour and gas coming from the lower plate 11 and for condensated vapour falling back on the lower plate 11.

On top of the intermediate plate 12 the upper plate 13 is arranged with the interposition of an upper spacing element 18 made of insulating material, on top of the upper plate 13, the handle 14 is positioned.

The lower surface of the upper plate 13 has a concavity facing downward to favour the accumulation of condensate originating from vapours in contact with the upper plate 13, the temperature of which is still lower than that of the intermediate plate 12. Thus, the condensate accumulates and falls back in an increased amount on the upper surface of the intermediate plate 12. Further, the upper surface of the intermediate plate 12 has a concavity facing upward, to favour the collection of condensate and the flow of liquid substances downwards through the holes 17.

The lower surface of the upper plate 13 can further present an undulated shape in order to increase the surface met by the saturated vapour increasing the condensing effect of the upper plate 13.

The diameter of the intermediate plate 12 is smaller than the diameter of the lower plate 11 and the diameter of the upper plate 13 is smaller than the diameter of the intermediate plate 12, in order to allow the intermediate plate 12 and the upper plate 13 can deflect vapour respectively outgoing through holes 15 of the lower plate 11 and holes 17 of the intermediate plate 12 without stopping its flow.

The lower spacing element 16 and the upper spacing element 18 are respectively connected to said lower plate 11 and said intermediate plate 12 and to said intermediate plate 12 and said upper plate 13 by means of a screw passing through a hole positioned in the centre of said plates 11, 12 and 13 and passing through said spacing elements 16 and 18.

On the basis of the above description, it is possible to understand that the essential feature of the improved perforated lid of the present invention consists in realising a lid for a container for cooking food said lid being constituted by three plates positioned one on top of the other and connected by insulating spacing elements, the lower plate 11 and the intermediate plate 12 being provided with holes 15, 17 for the passage of vapour and gas respectively coming from the cooking container and the lower plate 11 and going upwards and of condensate going downwards the intermediate plate 12 and the upper plate 13 being provided with a lower surface with a concavity facing downwards for the condensation and accumulation of vapour contacting said surface.

An advantage of the present invention is that of providing for a second condensation plate, above the first condensation plate, at a temperature lower than that of the first plate and on lower surface of which a liquid-vapour equilibrium is established allowing for the condensation and the consequent recovery of a higher amount of vapour.

In order to control the amount of condensate and adjust it according to specific cooking needs of different food, the screw connecting together the different plates 11, 12 and 13 and the spacing elements 16, 18 is adjustable, in order to vary the relative distance of the plates. This precaution can be used in case some food requires for a different time of cooking with a higher or lower recovery of cooking liquids, or to control the amount of condensate according to a higher or lower production of vapour.

A further advantage of the present invention is therefore that of controlling the height of the cooling means in order to control food cooking.

A second important feature in order to ensure an optimal cooking also in the particular case of frying is that of ensuring the lid 10 is sealed and operating so that it perfectly adheres to the upper rim of the cooking container.

Making reference in particular to FIG. 6 a fryer 20 for the use with the perforated lid 10 of the present invention is composed of: a shell 21 made of insulating material, inside which a pot 22 and an extractable drum 23 are positioned. The shell 21 is provided with handles 24 and is movably positioned above an electric cooking stove 25, provided with a control push-button panel 26, in particular for switching on and setting cooking time and temperature.

The fryer is thus made of three autonomous parts, i.e. the electric cooking stove 25, the pot 22 and the lid 10.

The possibility to separate the pot 22 with shell 21, the handles 24 and the extractable drum 23 from the electric cooking stove 25 allows for washing the former with no risk of damaging the electric components of the stove 25. Further, if needed the pot 22 can be used with different heating sources than the electric cooking stove 25, such as for example a gas stove or the like. Further, the electric cooking stove 25 can be used with other cooking container, such as for example with a standard pot.

A second important aspect in order to assure an optimal cooking also in the particular case of frying is that of controlling the seal of the lid 10 and operate so that it adheres perfectly to the upper rim of the cooking container. For this purpose, the fryer 20 for use with the perforated lid 10 of the present invention can be provided with an airtight closure, obtained realising on the shell 21 hooks for the closure of the lid 10 on the fryer 20.

The present invention was described for illustrative, non limitative purposes, according to preferred embodiments, but it has to be understood that any variation and/or modification can be made by the skilled in the art without for this reason escaping the scope of protection, as defined by the enclosed claims.

The invention claimed is:

1. Improved perforated lid (10) for containers for cooking foods, comprising holes (15) for the passage of vapour and gas going upwards and of condensed vapour going downwards and means for cooling and condensing vapour passing through said holes, and means for supporting said means for cooling vapour, characterised in that said means for cooling vapour are made of a sequence, starting from the container for cooking foods and going upwards, comprised of a perforated lower plate (11), at least one perforated intermediate plate (12) and an upper plate (13) that is not perforated, and said means for supporting said means for cooling vapour are made of a lower spacing element (16), positioned between said lower plate (11) and said intermediate plate (12) and of an upper spacing element (18), positioned between said intermediate plate (12) and said upper plate (13).

2. Perforated lid (10) according to claim 1, characterised in that it comprises a plurality of intermediate plates (12), linked by a corresponding number of intermediate spacing elements.

3. Perforated lid (10) according to claim 1, characterised in that the upper surface of said lower plate (11) and the upper surface of said at least one intermediate plate (12) have a concavity facing upwards.

4. Perforated lid (10) according to claim 1, characterised in that the lower surface of said upper plate (13) and the lower surface of said at least one intermediate plate (12) have a concavity facing downwards.

5. Perforated lid (10) according to claim 1, characterised in that the lower surface of said upper plate (13) and the lower surface of said at least one intermediate plate (12) are undulated.

6. Perforated lid (10) according to claim 1, characterised in that the lower surface of said upper plate (13) and the lower surface of said at least one intermediate plate (12) are lamellar.

7. Perforated lid (10) according to claim 1, characterised in that said means for supporting said cooling means are adjustable.

8. Perforated lid (10) according to claim 1, characterised in that said means for supporting said cooling means comprise a screw.

9. Perforated lid (10) according to claim 1, characterised in that it comprises a handle (14) positioned on the upper end of said means for supporting said cooling means.

10. Fryer (20) for the use with the perforated lid (10) as defined according to claim 1, characterised in that it comprises a shell (21) made of insulating material, inside which a pot (22) and an extractable drum (23), said lid (10) and an electric cooking stove (25) are arranged, characterised in that said electric cooking stove (25) can be separated from the remaining elements of the fryer.

11. Fryer (20) according to claim 10, characterised in that it comprises one or more air-tight elements for said lid (10) on said pot (22).

* * * * *